United States Patent
Nagolu et al.

(10) Patent No.: US 11,250,284 B2
(45) Date of Patent: Feb. 15, 2022

(54) DEVICE FOR EMITTING RADIATION

(71) Applicant: Veoneer US, Inc., Southfield, MI (US)

(72) Inventors: Chakravarthi Mallikarjun Nagolu, Shelby Township, MI (US); Louis Lu, Southfield, MI (US); Jason Keto, Southfield, MI (US); Francis Joseph Judge, South Lyon, MI (US)

(73) Assignee: VEONEER US, INC., Southfield, MI (US)

( * ) Notice: Subject to any disclaimer, the term of this patent is extended or adjusted under 35 U.S.C. 154(b) by 0 days.

(21) Appl. No.: 16/574,330

(22) Filed: Sep. 18, 2019

(65) Prior Publication Data
US 2021/0081694 A1 Mar. 18, 2021

(51) Int. Cl.
  *G06K 9/20* (2006.01)
  *G05D 1/00* (2006.01)
  *B60W 50/16* (2020.01)
  *B60K 28/06* (2006.01)
  *G06K 9/00* (2022.01)

(52) U.S. Cl.
  CPC .......... *G06K 9/2036* (2013.01); *B60K 28/066* (2013.01); *B60W 50/16* (2013.01); *G05D 1/0055* (2013.01); *G06K 9/00845* (2013.01)

(58) Field of Classification Search
  CPC .... G06K 9/2036; B60W 50/16; G05D 1/0055
  See application file for complete search history.

(56) References Cited

U.S. PATENT DOCUMENTS

| | | | | |
|---|---|---|---|---|
| 4,936,533 A * | 6/1990 | Adams | ...................... | B60R 1/04 248/222.11 |
| 5,178,448 A * | 1/1993 | Adams | .................... | B60R 1/086 362/494 |
| 5,649,756 A * | 7/1997 | Adams | .................... | B60R 1/086 362/488 |
| 2002/0017844 A1* | 2/2002 | Parkyn | ...................... | G09F 9/33 313/113 |
| 2006/0044840 A1* | 3/2006 | Watanabe | ............. | F21S 41/148 362/647 |
| 2006/0125658 A1* | 6/2006 | Dohler | ...................... | B64F 1/20 340/951 |
| 2009/0096937 A1* | 4/2009 | Bauer | ....................... | B60R 1/12 348/739 |
| 2009/0279309 A1* | 11/2009 | Freeman | ................. | F21V 23/00 362/310 |
| 2013/0170013 A1* | 7/2013 | Tonar | ...................... | G02F 1/157 359/296 |
| 2014/0198503 A1* | 7/2014 | Van De Ven | ............. | F21K 9/20 362/249.02 |

(Continued)

*Primary Examiner* — Heather R Jones
(74) *Attorney, Agent, or Firm* — Dickinson Wright PLLC

(57) ABSTRACT

A device for emitting radiation includes a reflector component and a clip. The reflector component has a top side, a bottom side, and a perimeter side. At least one aperture formed within the reflector component that extends from a top opening on the top side of the reflector component through to a bottom opening on the bottom side of the reflector component. The clip may be connected to the reflector component and has a flat side that is in contact with the bottom side of the reflector component. Portions of the substantially flat side of the clip are configured to be soldered to a circuit board having an emitter which extends at least partially through the aperture when the clip is soldered to the circuit board.

19 Claims, 6 Drawing Sheets

(56) References Cited

U.S. PATENT DOCUMENTS

| | | | |
|---|---|---|---|
| 2016/0100084 A1* | 4/2016 | Schofield | G02B 27/01 |
| | | | 348/148 |
| 2016/0264054 A1* | 9/2016 | Uken | G02B 7/182 |
| 2017/0211790 A1* | 7/2017 | Lin | F21V 23/02 |
| 2017/0237946 A1* | 8/2017 | Schofield | B60Q 1/503 |
| | | | 348/148 |
| 2019/0203912 A1* | 7/2019 | Holder | F21V 5/04 |
| 2020/0379460 A1* | 12/2020 | Stent | B60W 60/0053 |

* cited by examiner

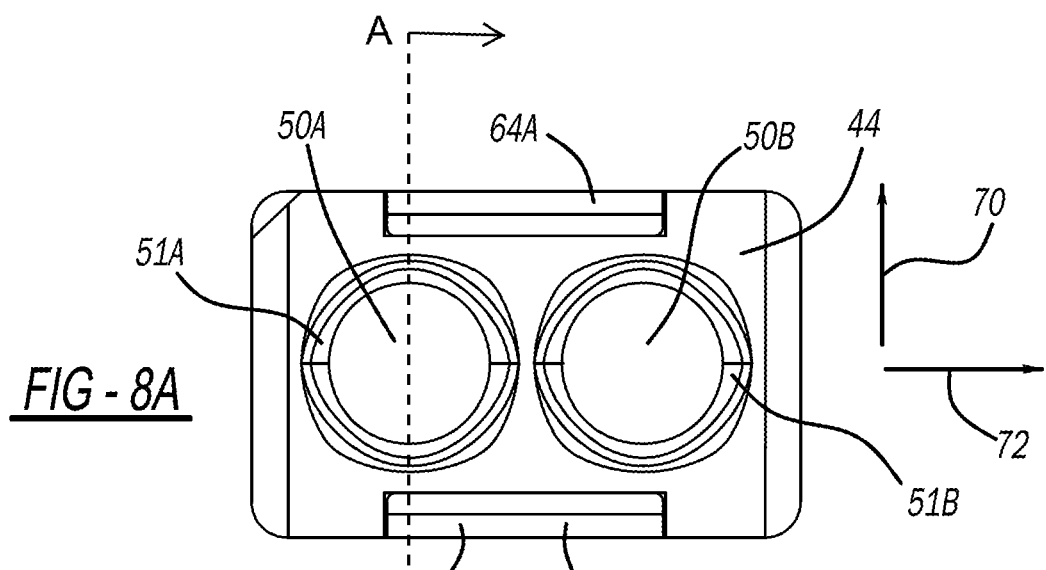
*FIG - 8A*
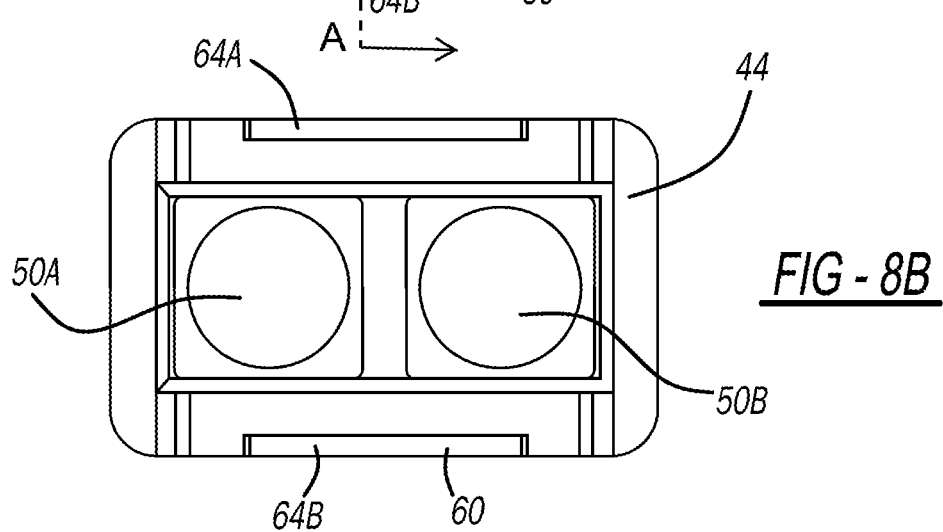
*FIG - 8B*
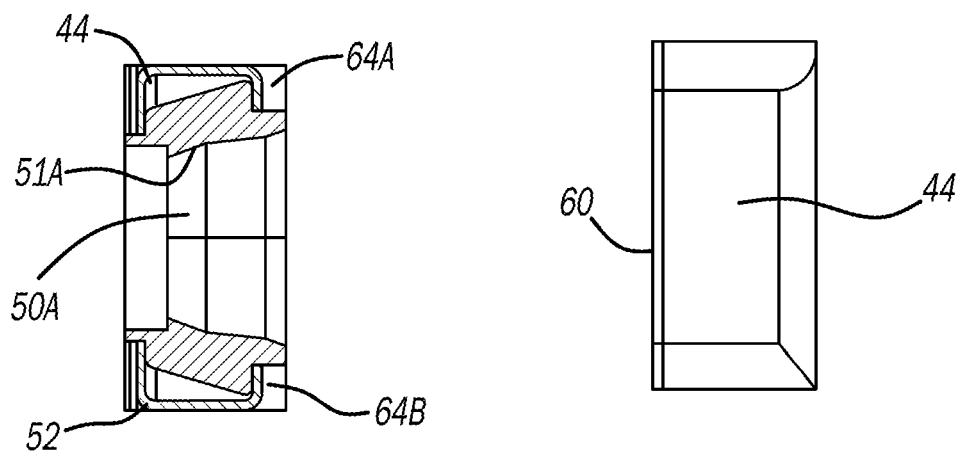
*FIG - 8C*          *FIG - 8D*

DEVICE FOR EMITTING RADIATION

BACKGROUND

1. Field of the Invention

The present invention generally relates to devices for emitting radiation, especially infrared radiation. The devices may be mounted to a module that may be mounted within an interior cabin of a vehicle.

2. Description of Related Art

Vehicles, especially automobiles, are undergoing significant developments involving autonomy. For example, some vehicles currently offered are able to perform some operations that were previously performed by the operator of the vehicle. For example, some vehicles include autonomous self-driving features, wherein the vehicle is able to pilot itself in certain situations.

However, while fully autonomous vehicles are currently under development, currently vehicles generally rely on the operator of the vehicle to perform certain tasks in certain situations. For example, some vehicles with autonomous features are able to pilot themselves while operating in certain stretches of a highway at times when the weather is favorable. However, these vehicles may be unable to pilot themselves in other geographic areas or may be unable to pilot themselves in areas due to inclement weather. In these situations, the operator of the vehicle may be required to provide some operational input to the vehicle.

As such, because the operator the vehicle may be required to provide operational input into the vehicle, the operator of the vehicle should generally be aware of the environment in which the vehicle is operating in. To those ends, the driver should be positioned within the cockpit such that the driver can see the environment in which the vehicle is operating through the windows of the vehicle.

Systems have been developed that can generally monitor the eye movements of vehicle operators so as to determine if the operator is monitoring the environment in which the vehicle is operating in. These systems generally include a radiation source for emitting radiation towards an operator of a vehicle. This radiation is then reflected back from the operator towards a camera system that can capture images of the operator and provide these images to a vehicle system that determines if the operator is properly monitoring the environment in which the vehicle is operating in.

SUMMARY

A device for emitting radiation includes a reflector component and a clip. The reflector component has a top side, a bottom side, and a perimeter side. At least one aperture formed within the reflector component that extends from a top opening on the top side of the reflector component through to a bottom opening on the bottom side of the reflector component. The clip may be connected to the reflector component and has a flat side that is in contact with the bottom side of the reflector component. Portions of the substantially flat side of the clip are configured to be soldered to a circuit board having an emitter which extends at least partially through the aperture when the clip is soldered to the circuit board.

Further objects, features, and advantages of this invention will become readily apparent to persons skilled in the art after a review of the following description, with reference to the drawings and claims that are appended to and form a part of this specification.

BRIEF DESCRIPTION OF THE DRAWINGS

FIGS. 8A-8D illustrate more detailed views of the reflector component and the clip that engages the reflector component.

DETAILED DESCRIPTION

Figure 1:
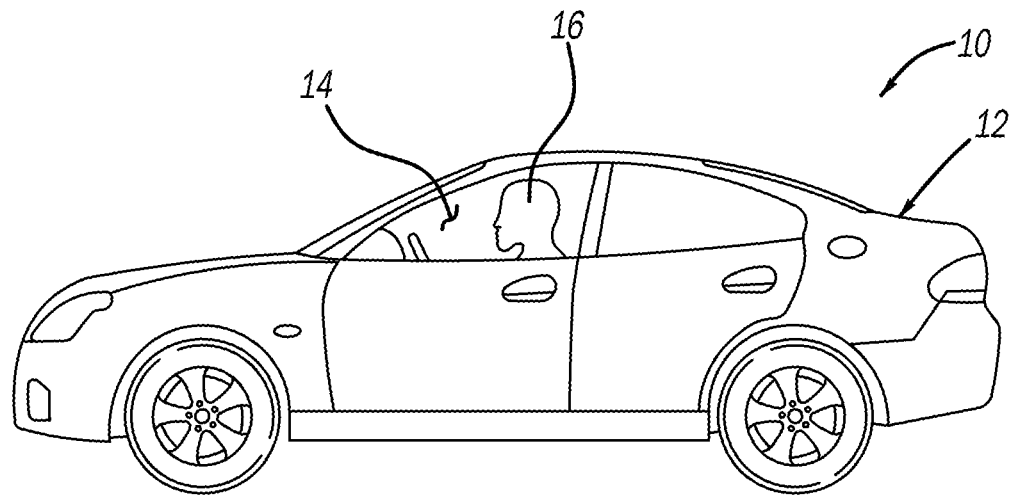
FIG. 1 illustrates a vehicle incorporating the device for emitting radiation.

Referring to FIG. 1, one example 10 incorporating a module having a device for emitting radiation is shown. In the example 10, the module for emitting radiation is incorporated within a vehicle 12. It should be understood that the module for emitting radiation that will be described in more detail later in this specification can be incorporated into any one of a number of different environments. Here, the module is incorporated within a vehicle and more specifically within an automobile.

If the module is incorporated within a vehicle, such as the vehicle 12, it should be understood that the vehicle 12 may be any one of a number of different vehicles capable of transporting persons or goods between two separate locations. As such, the vehicle could be an automobile, as stated before, or the vehicle could be a truck, heavy-duty truck, tractor-trailer, mining vehicle, locomotive, aircraft, watercraft, and the like. Again, the vehicle 12 can take any one of a number of different forms.

Figure 2:
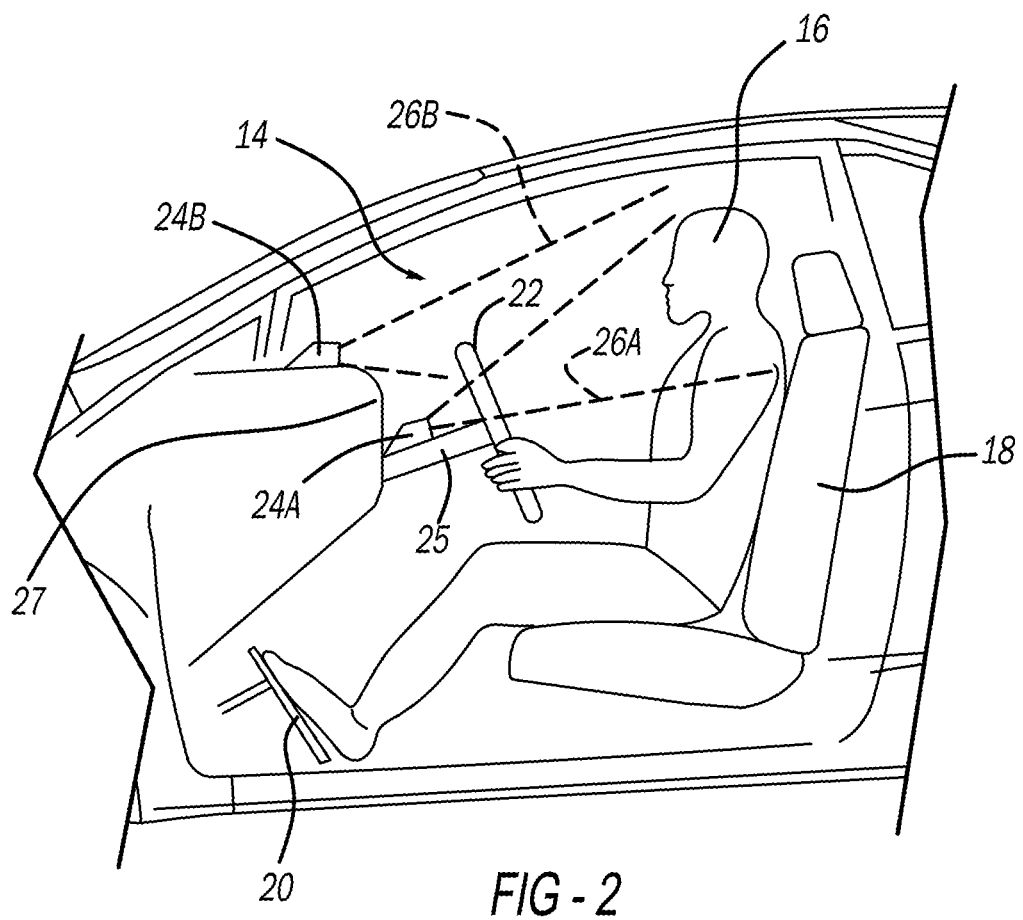
FIG. 2 illustrates a more detailed view of a side view of the interior of the vehicle of FIG. 1.

Here, the vehicle 12 generally defines an interior 14 that is configured to receive an operator 16 that operates the vehicle 12 from within the interior of the vehicle 12. As best shown in FIG. 2, the interior 14 of the vehicle 12 may include a seat that is capable of supporting the operator 16 within the interior 14 of the vehicle 12.

The operator 16 is capable of engaging any one of a number of different vehicle systems so as to pilot the vehicle 12 between separate locations. For example, the operator 16 may engage a steering wheel 22 that controls a steering system so as to control the steering of the vehicle 12. Additionally, the operator 16 may also be able to engage one or more pedals 20 so as to control the forward or rearward movement of the vehicle 12. The one or more pedals 20 may be in communication with a vehicle powertrain and or braking system so as to propel the vehicle 12 either forward or rearward and/or stop the vehicle 12 when desired by the operator 16.

Located within the interior 14 of the vehicle 12 are one or more modules 24A and/or 24B for emitting radiation. It should be understood that any one of a number of different modules 24A and/or 24B may be utilized and placed within the interior 14 of the vehicle 12. Here, in this example, two such modules 24A and 24B are shown. The module 24A is generally located above a steering column 25 that is attached to the steering wheel 22. The module 24A is placed above steering column 25 so as to have a field of view 26A. This field of view 26A may be such that the field of view 26A includes portions of the operator 16 and possibly portions of other occupants located within the interior 14 of the vehicle 12.

Figure 3:
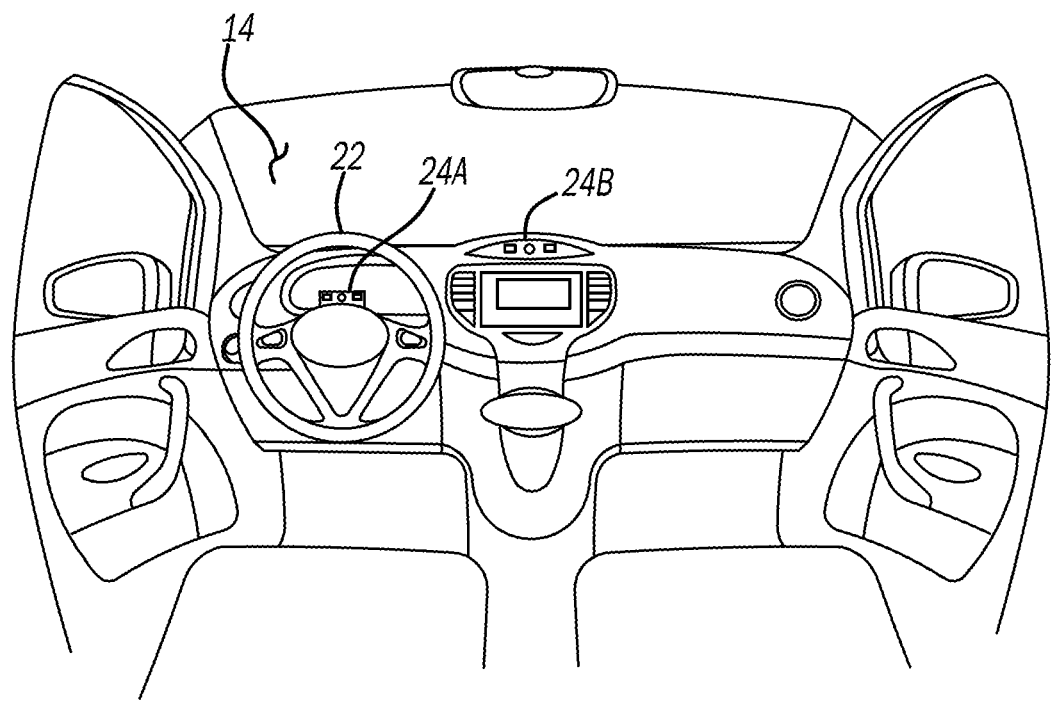
FIG. 3 illustrates a more detailed view of a front view of the interior of the vehicle of FIG. 1.

The module 24B is located generally above a center stack 27 of the vehicle 12. As it is well understood, the center stack 27 is located generally in the middle of the front interior of the vehicle 12, as best shown in FIG. 3. The center stack 27 may include a number of different vehicle systems, such as vehicle infotainment system and heating, ventilation, and cooling systems and/or other controls for the vehicle 12.

The module 24B is situated so as to have a field of view 26B. The field of view 26B may include all or parts or even none of the field of view 26A provided by the other module 24A. As such, the module 24B may be utilized so as to view more broadly multiple occupants, including the operator 16, located within the interior 14 of the vehicle 12. Conversely, the module 24A may be utilized so as to focus on portions of the operator 16, such as the face of the operator 16 more particularly. Furthermore, it should be understood that the field of views 26A and 26B may be shaped or formed by the device, as will be indicated later in this specification. For example, the field of views 26A and 26B may be views or angles in which radiation is emitted from the devices. These angles of radiation may be conical in nature, essentially equal from all sides, or may be shaped differently so as to expand and retract the angle radiation in either the X and/or Y direction.

One possible reason for carefully focusing on portions of the operator 16 by the module 24A is so that the module 24A is capable of capturing images of the face of the operator 16. This may be desirable in situations where control systems within the vehicle are determining if the operator 16 is properly engaging the vehicle 12 and/or is properly focused on the environment in which the vehicle 12 is operating in. If the control systems determine that the operator 16 is not properly engaging the vehicle 12 and or is not properly focused on the environment, the control systems may alert the driver of this failure through either an audible, visual, and/or tactile feedback.

For example, if the vehicle 12 is an autonomous vehicle or semi-autonomous vehicle, there may be situations where the autonomous features of the vehicle are unable to operate the vehicle in the environment in which it is situated. This may arise in situations wherein there is inclement weather or where there is a scenario that is unfamiliar to the autonomous features of the vehicle. These unfamiliar scenarios can include situations that involve road construction, accidents, and other types of scenarios in which the autonomous vehicle may not be suitable for operating the vehicle 12.

Therefore, by having the vehicle 12 utilize the modules 24A and/or 24B, vehicle systems and subsystems of the vehicle 12 can determine if the operator 16 is properly engaging the vehicle 12 and/or aware of the environment in which the vehicle 12 is operating. If the operator 16 is not properly engaging the vehicle 12 or is not aware of the environment in which the vehicle 12 is operating, one or more vehicle systems could alert the driver either through a tactile, audible, and/or visual feedback so as to alert the operator 16 that they should properly engage the vehicle 12 or pay closer attention to the environment in which the vehicle 12 is operating in.

Figure 4:
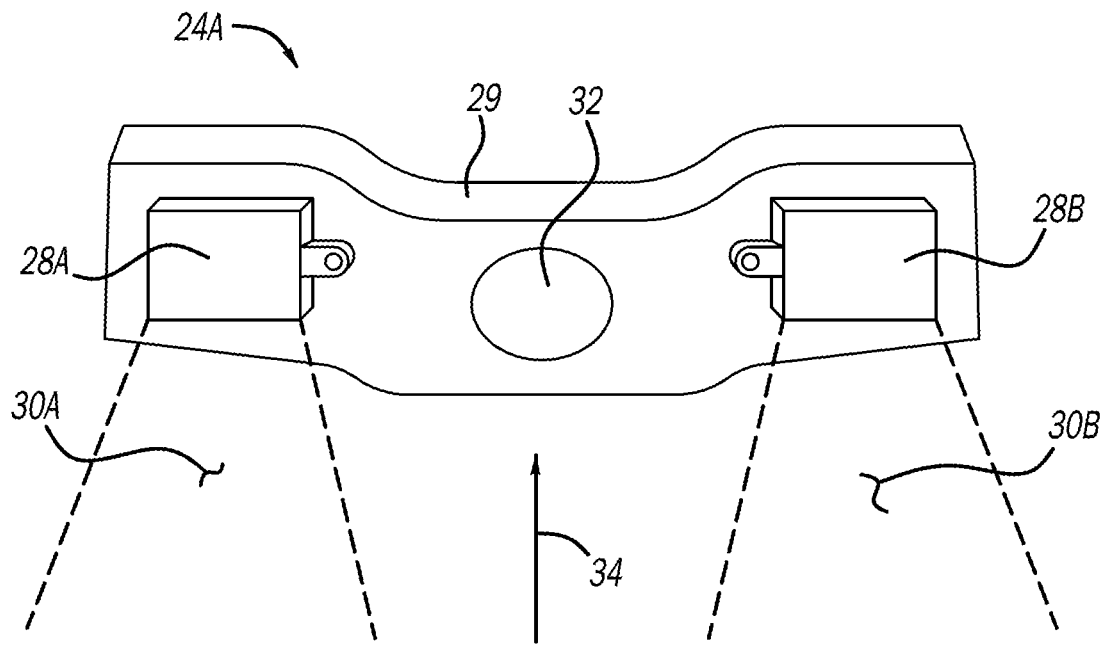
FIG. 4 illustrates a module incorporating two devices for emitting radiation.

Referring to FIG. 4, a more detailed view of the module 24A is shown. It should be understood that the description provided for the module 24A may be equally applicable to the module 24B. Here, the module 24A includes a bracket 29 that may be configured to be mounted within the interior 14. Moreover, the bracket 29 may be mounted on the steering wheel 22, the steering column 25, and/or the center stack 27 of the vehicle 12. Of course, it should be understood that the bracket 29 may be mounted anywhere within the interior 14 of the vehicle 12.

The bracket 29 may be made of any one of a number of different materials. As such, the bracket 29 may be made of steel, aluminum, plastic, or any material capable of forming a solid or semi-solid shape. In this example, the bracket 29 may be made of a heat conductive material, such as steel or aluminum so that the bracket 29 may act as a heat sink.

The bracket 29 functions to hold one or more devices 28A and/or 28B that are configured to emit radiation from the devices into the interior 14 of the vehicle 12. Here, the devices 28A and 28B emit radiation over a field of view 30A and 30B, respectively. The field of view 30A and 30B may essentially be an angle of radiation. The angle of radiation is the angle in which the radiation is emitted from the device 28A and/or 28B. As will be explained later in this specification, the angle of radiation may be a single angle of radiation or may be multiple angles of radiation so as to form the projection of the radiation from the device 28A and/or 28B.

This radiation may be any one of a number of different forms of radiation. As such, this radiation may be infrared radiation or may be radiation within the visible spectrum. Again, it should be understood that the radiation can be any one of a number of different forms of radiation, not necessarily infrared radiation or radiation within the visible spectrum.

Located between the devices 28A and 28B may be a camera 32 that is capable of receiving reflected radiation as indicated by arrow 34. The reflected radiation 34 may be radiation that was reflected by one or more objects. This radiation may have originated from the devices 28A and/or 28B and then was reflected by an object within the field of view (angle of radiation) of the devices 28A and/or 28B. The camera 32 may be connected to any one of a number of different vehicle systems that can interpret this radiation that was captured by the camera 32. The radiation captured by the camera 32 may be in the form of a plurality of images captured by the camera 32 over a period of time.

Figure 5:
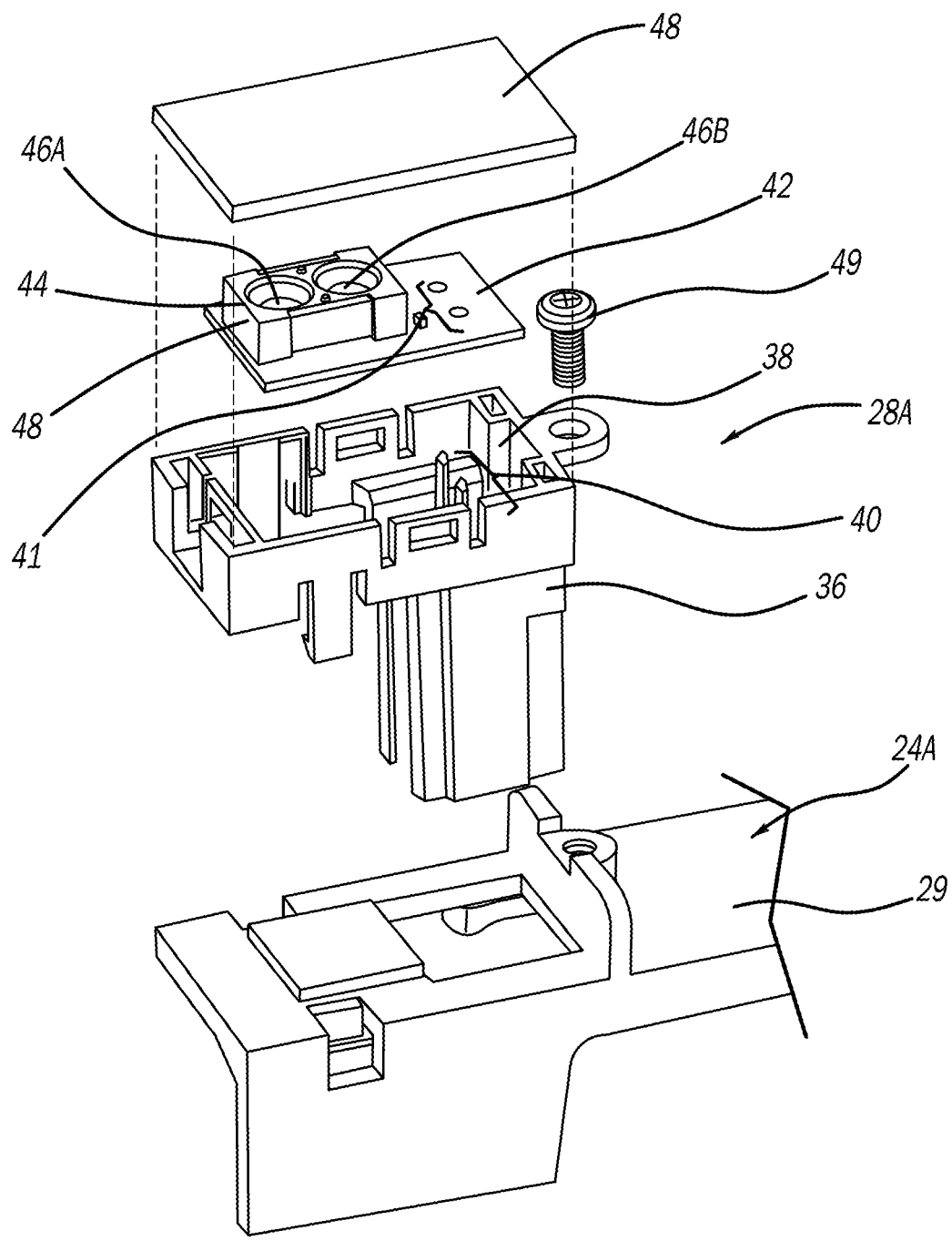
FIG. 5 illustrates an exploded view of the device for emitting radiation.

Referring to FIG. 5, a more detailed and exploded view of the device 28A is provided. It should be understood that the description of the device 28A may be equally applicable to the device 28B. Here, as stated previously, the device 28A is mounted within a bracket 29 of the module 24A. As its primary components, the device 28A includes a housing 36, a circuit board 42 located within a cavity 38 of the housing 36, and a filter 48 that is configured so as to substantially encapsulate the circuit board 42 within the cavity 38 of the housing 36.

The filter 48 may be made of acrylic. The filter 48 may be an infrared filter that is a long pass filter. A long pass filter is an optical interference filter that attenuates shorter wavelengths and transmits (passes) longer wavelengths over the active range of the target spectrum (ultraviolet, visible, or infrared).

A reflector component 44 may be mounted to the circuit board 42. The circuit board 42 also has emitters 46A and/or 46B that are mounted on the circuit board 42 and protrude at least partially through the reflector component 44. The emitters 46A and/or 46B function to emit the radiation previously described in this specification. The emitters 46A and/or 46B are in communication with the circuit board 42 and are capable of being electronically connected to the pins 40 of the housing 46 via holes 41 formed within the circuit board 42.

The reflector component 44 may be made of plastic and coated with a metal. The plastic may be polycyclohexylenedimethylene terephthalate, while the metal coating may contain chromium.

These holes 41 include conductive components that are capable of electrically connecting to the pins 40 so as to place the emitters 46A and/or 46B in electrical communication with the pins 40. The pins 40 may be connected to a cable that interacts with the housing 36. This cable may have electrical conduits that form an electrical connection to the pins 40 and allow a vehicle system that is in communication with the pins 40 control the emission of radiation by the emitters 46A and/or 46B.

The pins 40 may be in the form of press pins that essentially allow the holes 41 of the circuit board 42 to engage the pins 40 of the housing 36. The pins 40 pass through the holes 41 when a force is placed upon them but then physically prevent the removal of the circuit board 42 from the pins 40 unless a significant force is then applied.

A screw 49 may function so as to attach the housing 36 and/or the filter 48 to the bracket 29 so as to fixedly attach all the components to the bracket 29 so as to form the module 24A.

Figure 6A:
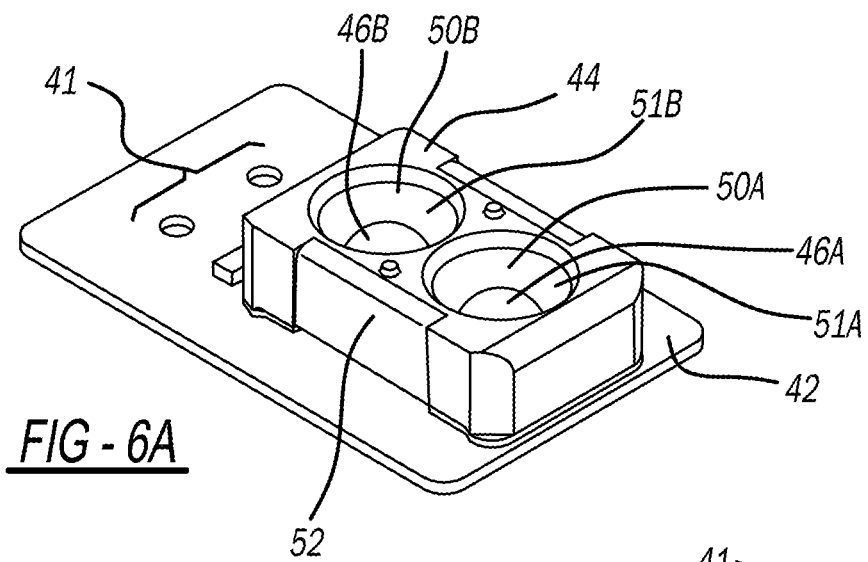
FIGS. 6A-6C illustrate a circuit board and a reflector component of the device for emitting radiation.
Figure 6B:
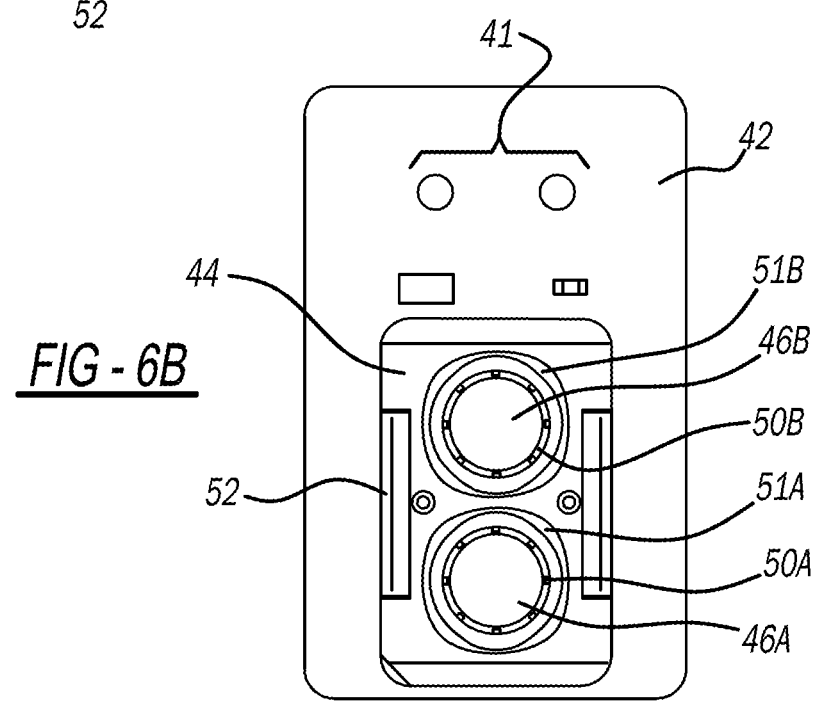
Figure 6C:
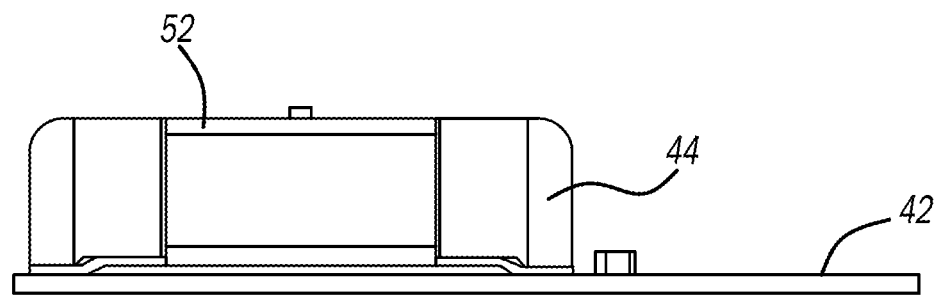

Referring to FIGS. 6A, 6B, and 6C, more detailed views of components of the device permitting radiation are shown. Like before, the device includes a circuit board 42 having holes 41 formed thereon. The holes 41 have conductive portions that allow press pins that engage the holes 41 to be in electrical communication with the emitters 46A and 46B.

The reflective component 44 has a first aperture 50A and a second aperture 50B formed thereon. It should be understood that the reflective component 44 may have any one of a number of different apertures. In fact, the reflective component 44 may only comprise of a single aperture or many apertures. The apertures 50A and 50B extend through the length of the reflective component 44 and allow the emitters 46A and 46B protrude at least partially through the apertures 50A and 50B of the reflective component 44.

The apertures 50A and 50B have reflective surfaces 51A and 51B, respectively. These reflective surfaces 51A and 51B may be Lambertian surfaces that provide a Lambertian reflectance. Lambertian reflectance is the property that defines an ideal "matte" or diffusely reflecting surface. The apparent brightness of a Lam bertian surface to an observer is the same regardless of the observer's angle of view.

A clip 52 may be connected to the reflector component 44 so as to provide a conduit for connecting the reflector component 44 to the circuit board 42. Moreover, the clip may be soldered to the circuit board 42.

Figure 7A:
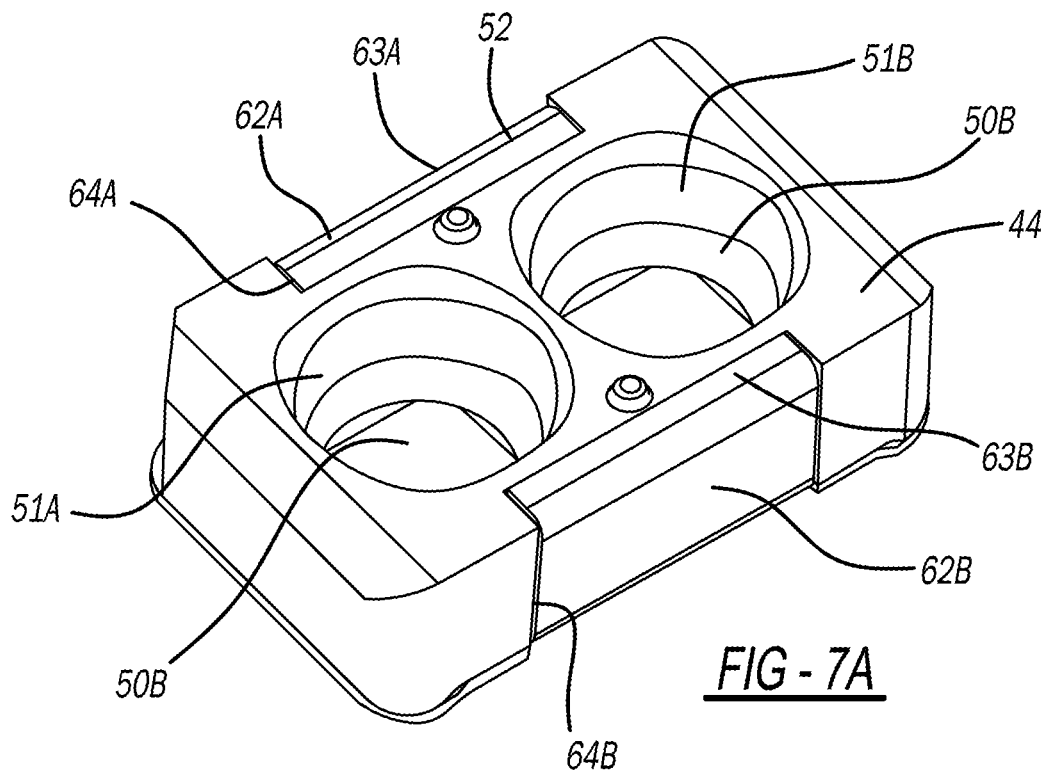
FIGS. 7A and 7B illustrate more detailed views of the reflector component and a clip that engages the reflector component.
Figure 7B:
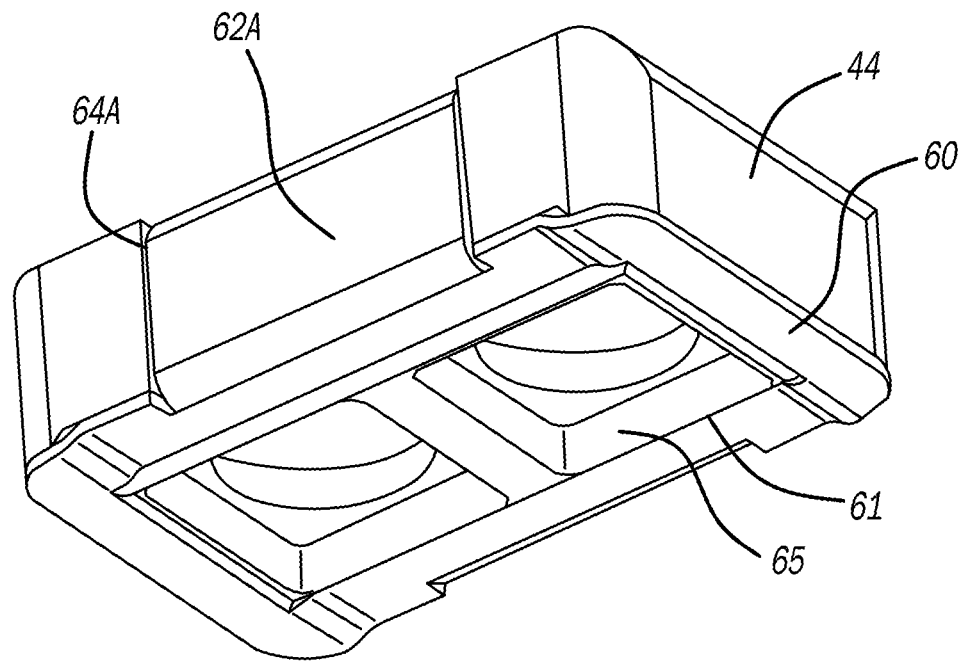

Referring to FIGS. 7A and 7B, a more detailed view of the reflector component 44 and the clip 52 are shown. Here, the clip 52 may have a flat side 60 that defines a perimeter portion 61 having an opening 65 that allows for the emitters 46A and 46B to pass therethrough. Extending from the flat side 60 may be walls 62A and 62B. The walls 62A and 62B may extend upward from the flat side 60 in a substantially perpendicular manner. Moreover, if one assumes that the flat side 60 defines a plane, the walls 62A and 62B may generally extend upward in a substantially perpendicular direction to the plane defined by the flat side 60.

The reflector component 44 may have two indentations 64A and 64B formed within the reflector component 44 that may mate with the walls 62A and 62B of the clip 52. The walls 62A and 62B may have portions 63A and 63B, respectively, that wraparound portions of the reflector component 44 and engage the indentations 64A and 64B.

Generally, in order to have the clip 52 engage the reflector component 44, the clip 52 is made of a slightly flexible material that allows the walls 62A and 62B of the clip 52 to momentarily bend slightly when the clip 52 is pressed onto the reflective component 44. The walls 62A and 62B of the clip 52, when pressed onto the reflector component 44, snap fit into the indentations 64A and 64B of the reflector component 44, thereby retaining the clip 52 to the reflector component 44.

Referring to FIGS. 8A-8D, another view of the reflector component 44 having the clip 52 is shown. Here, the apertures 50A and 50B may not necessarily be circular in shape as indicated in FIG. 8A but may be oval in shape. Moreover, the apertures may be such that the reflective surfaces 51A and 51B reflect radiation from the surfaces in a noncircular pattern. The arrows 70 and 72 essentially indicate the directions Y and X, respectively.

Here, radiation that is reflected by the reflective surfaces 51A and 51B may reflect radiation emitted by the emitter so as to generate an angle of radiation from the reflector component 44. The angle of radiation is between approximately 20 degrees and 150 degrees.

In situations wherein the reflective surfaces 51A and 51B are noncircular in shape, the angle of radiation may include a first angle of radiation radiated in an x-direction 72 and a second angle of radiation in a Y-direction 70. The X-direction 72 and y-direction 70 may be substantially perpendicular to each other.

As such, the first angle of radiation and the second angle of radiation may each be between approximately 20 degrees and 150 degrees. Furthermore, and more specifically, the first angle of radiation is may be 50 degrees and the second angle of radiation may be approximately 40 degrees.

The angle of radiation in the Y direction 70 in the X direction 72 may be useful in certain situations so as to radiate radiation in the desired direction better. For example, in situations where one wants to illuminate the face of an operator of the vehicle, the radiation may be reflected so as to better focus the radiation on the face of the operator of the vehicle. In other situations, where one desires to illuminate more of the interior of the vehicle, the angles that the radiation is reflected by the reflector component 44 may be increased so as to illuminate a greater field of view.

Illuminating a greater field of view has certain advantages in that it allows the camera to capture more information. However, there is the drawback that illuminating a greater field of view may also result in less precise information and images captured by the camera. As such, depending on the circumstance, different angles of radiation can be utilized to fit the application appropriately.

As a person skilled in the art will readily appreciate, the above description is meant as an illustration of an implementation of the principles this invention. This description is not intended to limit the scope or application of this invention in that the invention is susceptible to modification, variation, and change, without departing from the spirit of this invention, as defined in the following claims.

The invention claimed is:

1. A device for emitting radiation, the device comprising:
   a reflector component having a top side, a bottom side and
      a perimeter side;

at least one aperture formed within the reflector component, the at least one aperture extends from a top opening on the top side of the reflector component through to a bottom opening on the bottom side of the reflector component, wherein a portion of the reflector component forming the at least one aperture is reflective; and a clip connected to the reflector component, the clip having a substantially flat side in contact with the bottom side of the reflector component, wherein a portion of the substantially flat side of the clip is configured to be soldered to a circuit board having an emitter, the emitter extending at least partially through the aperture when the clip is soldered to the circuit board.

2. The device for emitting radiation of claim 1, further comprising the emitter is an infrared emitter.

3. The device for emitting radiation of claim 1, wherein the flat side of the clip comprises a perimeter portion that defines an opening for allowing the emitter through the opening and into the at least one aperture of the reflector component.

4. The device for emitting radiation of claim 1, the device further comprising:

at least one indentation formed on the perimeter side of the reflector component; and wherein the clip has at least one wall that extends from the substantially flat side of the clip, wherein the wall of the clip is configured to engage the at least one indentation formed on the perimeter side of the reflector component.

5. The device for emitting radiation of claim 4, further comprising:

the at least one indentation comprises two indentations formed on substantially opposing sides of the perimeter side of the reflector component; and wherein the at least one wall of the clip comprises two walls that each extend in a same direction from the substantially flat side of the clip; and wherein one wall of the two walls of the clip is configured to engage the one of the two indentations, while the other wall of the two walls of the clip is configured to engage the other of the two indentations.

6. The device for emitting radiation of claim 5, further comprising portions of the two walls of the clip engage the top side of the reflector component.

7. The device for emitting radiation of claim 1, further comprising the at least one aperture of the reflector component is configured to reflect radiation emitted by the emitter through the top side of the reflector component so as to generate a projection of the radiation defining an angle of radiation from the reflector component.

8. The device for emitting radiation of claim 7, further comprising the angle of radiation is between 20 degrees and 150 degrees.

9. The device for emitting radiation of claim 7, wherein the angle of radiation further comprises a first angle of radiation radiated in an x-direction and a second angle of radiation in a y-direction.

10. The device for emitting radiation of claim 9, wherein the x-direction and y-direction are perpendicular to each other.

11. The device for emitting radiation of claim 10, wherein the first angle of radiation and the second angle of radiation are between approximately 20 degrees and 150 degrees.

12. The device for emitting radiation of claim 11, wherein the first angle of radiation is approximately 50 degrees and the second angle of radiation is approximately 40 degrees.

13. The device for emitting radiation of claim 1, wherein the at least one aperture is oval in shape.

14. The device for emitting radiation of claim 1, further comprising the portion of the reflector component forming the at least one aperture is a Lambertian reflective surface.

15. The device for emitting radiation of claim 1, further comprising the reflector component is plastic coated with a metal.

16. The device for emitting radiation of claim 15, further comprising the metal contains chromium.

17. The device for emitting radiation of claim 15, further comprising the plastic is polycyclohexylenedimethylene terephthalate.

18. The device for emitting radiation of claim 1, further comprising the device is mounted within a module having a camera.

19. The device for emitting radiation of claim 1, further comprising the device is a component of a module mounted within a vehicle having an interior, the module being orientated within the vehicle such that a viewing angle of the camera includes a position of an occupant located within the interior of the vehicle.

* * * * *